United States Patent
Atar et al.

(10) Patent No.: US 11,962,558 B1
(45) Date of Patent: Apr. 16, 2024

(54) SYSTEM, METHOD, AND COMPUTER PROGRAM FOR AN EXACTLY ONCE MESSAGING PROTOCOL IN A PUBLISH-SUBSCRIBE MESSAGING SYSTEM

(71) Applicant: Amdocs Development Limited, Limassol (CY)

(72) Inventors: Tehila Atar, Tushia (IL); Nir Makmal, Petah Tikva, IL (US)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 17/972,465

(22) Filed: Oct. 24, 2022

(51) Int. Cl.
G06F 15/16 (2006.01)
H04L 51/216 (2022.01)
H04L 51/226 (2022.01)

(52) U.S. Cl.
CPC .......... H04L 51/226 (2022.05); H04L 51/216 (2022.05)

(58) Field of Classification Search
CPC ............................ H04L 51/226; H04L 51/216
USPC ........................................................ 709/206
See application file for complete search history.

(56) References Cited

U.S. PATENT DOCUMENTS

| | | | | |
|---|---|---|---|---|
| 6,615,383 B1* | 9/2003 | Talluri | ................ | H04L 49/9078 714/749 |
| 7,302,634 B2* | 11/2007 | Lucovsky | ............... | H04L 67/62 709/217 |
| 7,664,724 B2* | 2/2010 | Lucovsky | ........... | G06F 21/6227 707/999.001 |
| 7,945,631 B2* | 5/2011 | Chkodrov | ............... | H04L 51/00 709/206 |
| 7,945,819 B2* | 5/2011 | Chkodrov | ............... | H04L 51/00 714/49 |
| 8,200,836 B2* | 6/2012 | Chkodrov | ............... | H04L 51/00 719/314 |
| 8,214,847 B2* | 7/2012 | Chkodrov | .............. | G06Q 10/10 719/314 |
| 9,483,329 B2* | 11/2016 | Ritter | ........................ | G06F 8/10 |
| 9,917,913 B2* | 3/2018 | Qin | ....................... | H04L 67/565 |
| 9,990,383 B2* | 6/2018 | Brinnand | .............. | G06F 16/258 |
| 10,212,120 B2* | 2/2019 | Norwood | ................ | H04L 51/18 |
| 10,387,426 B2* | 8/2019 | Singh | ..................... | G06F 16/283 |
| 10,484,326 B2* | 11/2019 | Norwood | ................ | H04L 12/66 |
| 10,491,498 B2* | 11/2019 | Zhao | ........................ | H04L 43/10 |
| 10,608,994 B2* | 3/2020 | Anderson | ........... | H04L 63/0263 |

(Continued)

OTHER PUBLICATIONS

S. Bhola, R. Strom, S. Bagchi, Yuanyuan Zhao and J. Auerbach, "Exactly-once delivery in a content-based publish-subscribe system," Proceedings International Conference on Dependable Systems and Networks, Washington, DC, USA, 2002, pp. 7-16, doi: 10.1109/DSN.2002.1028881. (Year: 2002).*

(Continued)

*Primary Examiner* — Alicia Baturay
(74) *Attorney, Agent, or Firm* — Zilka-Kotab, P.C.

(57) ABSTRACT

As described herein, a system, method, and computer program are provided for an exactly once messaging protocol in a publish-subscribe messaging system. A consumer (i.e. subscriber) of a publish-subscribe messaging system is identified. For each required consumer, and for each subscribed topic of the consumer, a new dedicated consumer is created for the topic in the publish-subscribe messaging system. The new dedicated consumer is used to ensure that messages published to the topic are delivered exactly once to each associated consumer.

19 Claims, 5 Drawing Sheets

(56) References Cited

U.S. PATENT DOCUMENTS

| | | | | |
|---|---|---|---|---|
| 10,642,918 | B2* | 5/2020 | Sahni | G06F 16/958 |
| 10,645,181 | B2* | 5/2020 | Hoffner | H04L 67/55 |
| 10,735,530 | B1* | 8/2020 | Burnett | H04L 67/51 |
| 10,848,464 | B2* | 11/2020 | Anderson | G06F 16/275 |
| 10,862,786 | B2* | 12/2020 | Zhao | H04L 43/10 |
| 10,942,823 | B2* | 3/2021 | Pardon | G06F 11/2023 |
| 10,942,930 | B2* | 3/2021 | Kemme | G06F 16/24578 |
| 11,005,959 | B1* | 5/2021 | Borhade | H04L 67/63 |
| 11,121,945 | B2* | 9/2021 | Dey | H04L 67/306 |
| 11,178,235 | B2* | 11/2021 | Burnett | G06F 16/128 |
| 11,283,865 | B2* | 3/2022 | Madisetti | H04L 9/50 |
| 11,294,887 | B2* | 4/2022 | Pippin | G06F 16/2456 |
| 11,316,690 | B2* | 4/2022 | Madisetti | H04L 41/044 |
| 11,316,933 | B2* | 4/2022 | Madisetti | H04L 43/0882 |
| 11,528,147 | B2* | 12/2022 | Madisetti | H04L 9/50 |
| 11,553,039 | B2* | 1/2023 | Madisetti | H04L 67/108 |
| 11,558,446 | B2* | 1/2023 | Pippin | H04L 67/01 |
| 11,615,097 | B2* | 3/2023 | Trainor | G06F 3/167 707/628 |
| 11,665,094 | B2* | 5/2023 | Deshmukh | H04L 43/062 370/392 |
| 11,681,569 | B2* | 6/2023 | Pippin | G06F 16/24568 719/318 |
| 2007/0198629 | A1* | 8/2007 | Ganguly | H04L 12/66 709/203 |
| 2017/0103108 | A1* | 4/2017 | Datta | G06F 16/24568 |
| 2021/0365460 | A1* | 11/2021 | Pippin | G06F 16/24556 |

OTHER PUBLICATIONS

Richardson, C., "Pattern: Idempotent Consumer," Microservice Architecture, 2021, 1 page, retrieved from https://microservices.io/patterns/communication-style/idempotent-consumer.html.

Confluent, "Idempotent Reader," Confluent Developer, 2022, 7 pages, retrieved from https://developer.confluent.io/patterns/event-processing/idempotent-reader/.

Apache Camel, "Idempotent Consumer," The Apache Software Foundation, 2022, 4 pages, retrieved from https://camel.apache.org/components/3.17.x/eips/idempotentConsumer-eip.html.

Apache Camel, "Using the Kafka Idempotent Repository," The Apache Software Foundation, 2022, retrieved from https://camel.apache.org/components/3.17.x/kafka-component.html#_using_the_kafka_idempotent_repository.

Richardson, C., "Handling duplicate messages using the Idempotent consumer pattern," Chris Richarsdon Consulting, Inc., Blog, 2020, 9 pages, retrieved from https://chrisrichardson.net/post/microservices/patterns/2020/10/16/idempotent-consumer.html.

Topolev, V., "How to Handle Duplicate Messages and Message Ordering in Kafka," Blog, Oct. 12, 2021, 9 pages, retrieved from https://betterprogramming.pub/how-to-handle-duplicate-messages-and-message-ordering-in-kafka-82e2fef82025.

Golder, R., "Kafka Idempotent Consumer With DynamoDB," Blog, 2022, 13 pages, retrieved from https://medium.com/lydtech-consulting/kafka-idempotent-consumer-with-dynamodb-99f765a99be5.

Tsafatinos et al., "Real-Time Exactly-Once Ad Event Processing with Apache Flink, Kafka, and Pinot," Uber Blog, Sep. 23, 2021, 13 pages, retrieved from https://www.uber.com/blog/real-time-exactly-once-ad-event-processing/.

Shareb, A., "Delivering billions of messages exactly once," Segment. io, Inc., Jun. 29, 2017, 14 pagers, retrieved from https://segment.com/blog/exactly-once-delivery/.

Apache Kafka, "4.6 Message Delivery Semantics," Kafka 3.3 Documentation, section 4.6, 2022, 3 pages, retrieved from https://kafka.apache.org/documentation/#semantics.

Mehta, A., "KIP-98—Exactly Once Delivery and Transactional Messaging Skip to end of metadata," Confluence, Jun. 20, 2019, 24 pages, retrieved from https://cwiki.apache.org/confluence/display/KAFKA/KIP-98+-+Exactly+Once+Delivery+and+Transactional+Messaging.

Narkhede, N., "Exactly-Once Semantics Are Possible: Here's How Kafka Does It," Confluent, Jun. 30, 2017, 20 pages, retrieved from https://www.confluent.io/blog/exactly-once-semantics-are-possible-heres-how-apache-kafka-does-it/.

* cited by examiner

SYSTEM, METHOD, AND COMPUTER PROGRAM FOR AN EXACTLY ONCE MESSAGING PROTOCOL IN A PUBLISH-SUBSCRIBE MESSAGING SYSTEM

FIELD OF THE INVENTION

The present invention relates to publish-subscribe messaging systems.

BACKGROUND

Publish-subscribe messaging systems generally refer to systems where messages are communicated by publishers and delivered to subscribers (i.e. consumers) based on a message subscription. In particular, in publish-subscribe messaging systems, the senders of messages (i.e. publishers) do not program their messages to be sent directly to specific receivers (i.e. subscribers), but instead categorize published messages into topics without knowledge of which subscribers to those topics, if any, there may be. Accordingly, subscribers subscribe to one or more topics and only receive messages that are published to those topics, without knowledge of which publishers, if any, have published the messages.

However existing publish-subscribe messaging systems (e.g. Kafka) do not provide "exactly once" messaging protocols out of the box for consumers. This means that consumers have to implement either business or technical idempotency logic in order to avoid damage and/or undesired behavior of the system (e.g. duplicated orders, products, charges etc.) due to message reprocessing.

The consumer controls its position (e.g. offset on Kafka) for its subscriptions (e.g. Kafka topic partition). If the consumer holds the subscription (e.g. topic partition) forever and it never crashes, then it could just store its position in memory. However, this is an unrealistic expectation. Once the consumer fails or disconnects from its subscriptions due to any reason, such as high and/or not expected processing time, high delay between pulls, network issues, etc., then the assigned subscriptions (e.g. Kafka topic partition) will be taken over by another consumer of a related consumers group or will be reassigned to the same consumer once it is restarted.

Further, on scaling scenarios, some consumer subscriptions (e.g. Kafka topic partitions) might be handed over to the new consumers group joiners. In such cases, the new assigned process will need to choose an appropriate position (e.g. Kafka offset) from which to start processing, in particular in order to avoid unplanned reprocessing of messages which were fully or partially handled by previous consumer owner.

There is thus a need for addressing these and/or other issues associated with the prior art. In particular, there is a need for publish-subscribe messaging systems to provide an exactly once messaging protocol, in which each message is ensured to be delivered once and only once.

SUMMARY

As described herein, a system, method, and computer program are provided for an exactly once messaging protocol in a publish-subscribe messaging system. A consumer (i.e. subscriber) of a publish-subscribe messaging system is identified. For each required consumer, and for each subscribed topic of the consumer, a new dedicated consumer is created for the topic in the publish-subscribe messaging system. The new dedicated consumer is used to ensure that messages published to the topic are delivered exactly once to each associated consumer.

DETAILED DESCRIPTION

Figure 1:
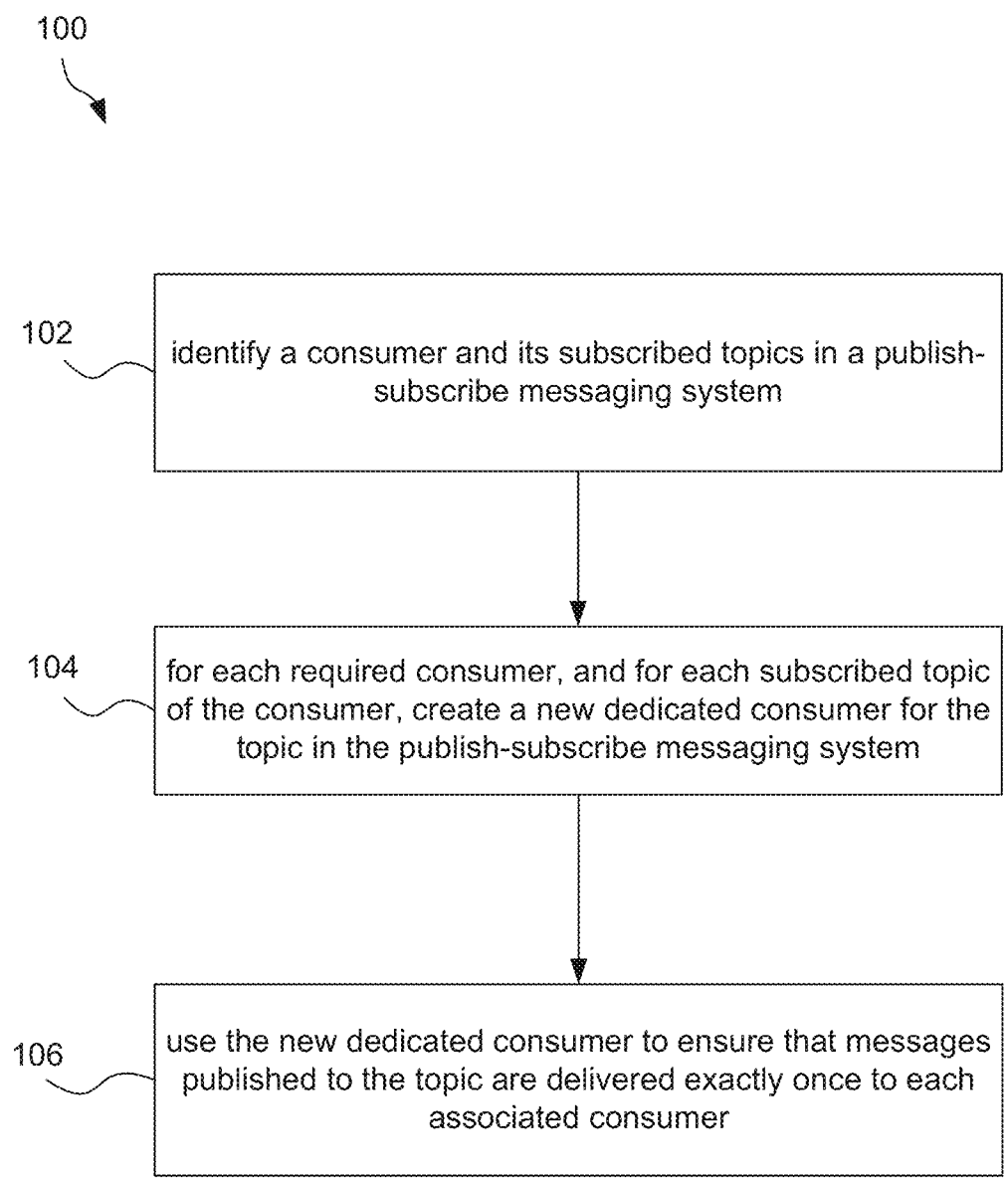
FIG. 1 illustrates a method for providing an exactly once messaging protocol in a publish-subscribe messaging system, in accordance with one embodiment.

FIG. 1 illustrates a method 100 for providing an exactly once messaging protocol in a publish-subscribe messaging system, in accordance with one embodiment. It should be noted that the method 100 may be performed by any computer system(s) described below with respect to FIGS. 4 and/or 5. In particular, the method 100 may be performed by a computer system on which a publish-subscribe messaging system executes.

With respect to the present description, a publish-subscribe messaging system refers to computer hardware and/or software that is configured to communicate messages between components (e.g. services, microservices, etc.) using a publish-subscribe protocol. The publish-subscribe protocol refers to a messaging protocol whereby a component (i.e. publisher) publishes a message to a topic (e.g. messaging channel, class, etc.), and where the message is then delivered to another component (i.e. consumer, subscriber, etc.) that subscribes to the topic. Thus, any components can act as a publisher to publish messages to any available topic, and any components can act as a consumer to subscribe to any available topic and accordingly receive the messages published thereto.

Also with respect to the present description, an exactly once messaging protocol refers to a protocol in which messages published to any topic are ensured to be delivered to that topic's subscribers once and only once (i.e. exactly one time). As a result, the same message will not be delivered to a subscriber more than one time. Of course, while the present embodiments focus on providing an exactly once messaging protocol in a publish-subscribe messaging system, the publish-subscribe messaging system may also support other messaging protocols, such as an "at most once" protocol where messages may be lost but are never redelivered and/or an "at least once" protocol where messages are never lost but may be redelivered. Any of these protocols may be used for any topics of the publish-subscribe messaging system, as desired.

Referring back to the method 100, in operation 102, per consumer, subscribed topics in a publish-subscribe messaging system are identified. As noted above, a topic may be a messaging channel, for example, to which messages are published by one or more publishers of the publish-subscribe messaging system. Likewise, the topic may be a messaging channel to which one or more consumers of the publish-subscribe messaging system subscribe for receiving the messages published to the topic by the by one or more publishers of the publish-subscribe messaging system.

In an embodiment, the topic of the publish-subscribe messaging system may be identified in combination with a determination that an idempotency flag is enabled on associated consumer configuration for the topic. The idempotency flag may be an indicator that an exactly once protocol is to be used for the topic associated consumer on its indicated topics.

In operation 104, for each required consumer, and for each subscribed topic of the consumer, a new dedicated consumer is created for the topic in the publish-subscribe messaging system. The new dedicated consumer refers to a consumer that newly created for dedicated use with the topic. Accordingly, the dedicated consumer may not migrate, etc. to other subscriptions.

In an embodiment, the new dedicated consumer may be created for a consumer group of the topic of the publish-subscribe messaging system. In an embodiment, the new dedicated consumer may be created for a microservice using the topic of the publish-subscribe messaging system. In any case, the new dedicated consumer is created when an exactly once protocol is to be used for the topic (e.g. when the idempotency flag is enabled on the associated consumer configuration [e.g. microservice configuration] for the topic of the publish-subscribe messaging system).

In an embodiment, the new dedicated consumer is created for the topic of the publish-subscribe messaging system when a microservice using the topic of the publish-subscribe messaging system starts up. Likewise, in an embodiment, the new dedicated consumer may be closed when the microservice shuts down.

In an embodiment, the new dedicated consumer stores positions (e.g. offsets) of messages subscribed from the topic by the associated consumer and that have reached a point of no return on its consuming flow. In an embodiment, the new dedicated consumer does not store the messages published to the topic of the publish-subscribe messaging system.

In an embodiment, the new dedicated consumer stores a maximum position of each message published to the topic partition that reaches a point of no return on the consuming flow of associated consumer. The point of no return may refer to a first non-idempotent operation on a flow executed for message processing in the publish-subscribe messaging system. An idempotent operation refers to an operation that can be performed many times without causing a different effect than if only performed once. The point of no return may be predefined for the topic and include one of: modifying the position automatically before starting a message consumption within the flow executed for the message processing, modifying the position automatically before committing a first database transaction on the flow executed for the message processing, or modifying the position on an application-developer configured point of the flow executed for the message processing.

In operation 106, the new dedicated consumer is used to ensure that messages published to the topic are delivered exactly once to each associated consumer. With respect to the present description, the associated consumer refers to a consumer with a subscription to the topic at a point in time in which the new dedicated consumer is being used in the present operation 106.

In an embodiment, the new dedicated consumer may be used in situations where messages published to the topic are susceptible to being delivered to a current consumer of the topic more than one time. For example, in various embodiments, the new dedicated consumer may be used upon binding a consumer to a subscription to the topic, upon rebalancing of consumers to a subscription to the topic, upon reassignment of consumers to a subscription to the topic, etc.

In an embodiment, the new dedicated consumer may be used to indicate which messages the current consumer should start processing. For example, the new dedicated consumer may be used to indicate a lowest offset of a message that has not yet reached a point of no return. In this way, the message with the lowest offset may be delivered to the current consumer. This may avoid a same message from being delivered to the current consumer twice, while ensuring that each message is delivered to the current consumer one time. In an embodiment, a local cache may also be synced with one or more latest handled messages.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
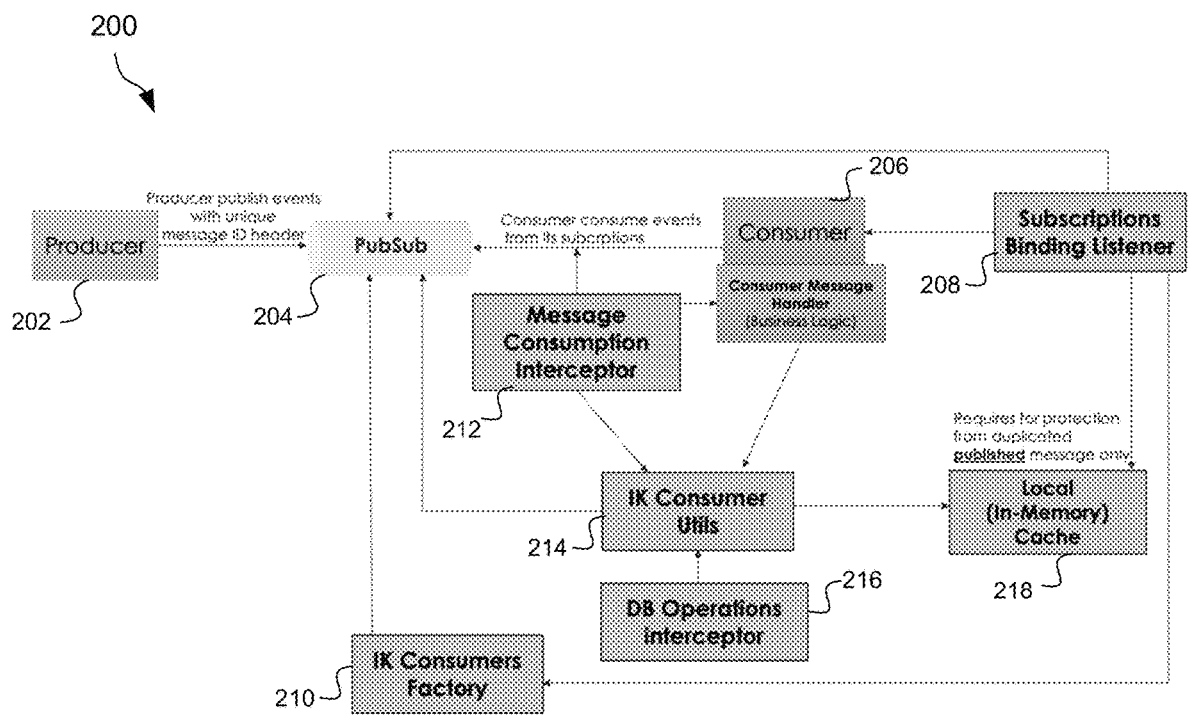
FIG. 2 illustrates a flow diagram of a publish-subscribe messaging system providing an exactly once messaging protocol, in accordance with one embodiment.

FIG. 2 illustrates a flow diagram of a publish-subscribe messaging system 200 providing an exactly once messaging protocol, in accordance with one embodiment. As an option, the system 200 may be implemented in the context of the details of the previous figure and/or any subsequent figure (s). Of course, however, the system 200 may be implemented in the context of any desired environment. Further, the aforementioned definitions may equally apply to the description below.

The publish-subscribe messaging system 200 includes a publisher 202 and consumer 206. The publisher 202 publishes messages to topics of the publish-subscribe messaging platform 204. The consumer 206 receives the messages from the publish-subscribe messaging platform 204 in accordance with its subscriptions to those topics.

In the present embodiment of the publish-subscribe messaging system 200, a topic, which is subscribed to by the consumer 206, is configured with an exactly once messaging protocol. When the publisher 202 publishes a message to the topic (with a unique message identifier header), the publish-subscribe messaging system 200 is configured to ensure that the message is delivered to the consumer exactly once.

For the subscribed topic which requires idempotency handling, an application will set the relevant microservice configuration including:

1) idempotency flag=enabled
2) Minimum delay time before new consumer start processing messages.
3) List of messages which requires protection (their consuming process includes non-idempotent operations) and their point of no return level.

Point of no return valid values include:

1) Consuming—default value. Dedicated consumer offset will be modified automatically before starting the message consumption application flow.
2) Database-transaction—Dedicated consumer offset will be modified automatically before committing the first database transaction on the business flow which is processing the message.
3) Custom—application developer will trigger the modification of the dedicated consumer offset on a desired point of the business flow (by using infrastructure dedicated consumer utility method).

As described herein, the publish-subscribe messaging system 200 employs multiple components 208-218 to provide the exactly once messaging protocol. By using these components 208-218, reprocessing of the same message due to rebalancing of consumers or network/availability issues may be prevented. Further, reprocessing of a message may also be prevented when such message was already processed and reached a point of no return. Still yet, the skipping of messages may trigger alert notifications or publish to a dedicated recovery topic.

It should be noted that components of the present embodiment refer to an Idempotency Keeper (IK), which is the dedicated consumer group for each subscribed topics of its associated consumer group. On startup of the microservice using the publish-subscribe messaging system 200 having a topic flagged to use an exactly once messaging protocol (i.e. having the enabled idempotency flag), an IK consumers factory 210 creates a new dedicated consumer is created for the topic using a consumer application programming interface (API) of the publish-subscribe messaging system 200. This is repeated for all topics flagged to use the exactly once messaging protocol. On shutdown of the microservice, IK consumers factory 210 closes all dedicated consumers that have been created.

On binding, rebalancing, and reassignment of a consumer to a subscription to the topic (e.g., Kafka topic partition), the IK consumers factory 210 makes sure that the consumer will start processing messages from an appropriate offset (i.e. the lowest offset which has not yet been handled and which has not reached the point of no return), and syncs the local store (cache) 218 with the latest handled messages.

A subscriptions binding listener 208 performs certain processing when partitions are assigned and revoked. Upon partition assignment, the subscriptions binding listener 208 groups new assigned partitions per topic, for each topic (with enabled idempotency flag), call the IK consumers factory 210 in order to get the dedicated consumer for related topics and updates the consumer assigned topic partitions, assigns the dedicated consumer to the same assigned partitions of real (current) consumers (using an assign method). For each new assigned topic partition, the subscriptions binding listener 208 calls a committed method on the dedicated consumer in order to get latest committed offset. If the committed offset on keeper consumer is greater than the offset on the real consumer, then the subscriptions binding listener 208 calls a seek method on the real consumer with the dedicated consumer offset in order to start consuming non-handled messages only. The subscriptions binding listener 208 logs/publishes alert notifications for skipped offsets and/or publishes them to a recovery topic. The subscriptions binding listener 208 also calls a pause method on the dedicated consumer in order to keep it alive while saving unnecessary pulling operations while syncing the local cache 218 (for duplicated published messages protection).

Upon partition revocation, the subscriptions binding listener 208 removes revoked topic partitions from the assigned partitions of the dedicated consumers.

An IK consumer utils 214 is a utility for modifying the dedicated consumer offset. This utility will be used by both infrastructure modules and application code for manual point of no return. Logic for modifying the dedicated consumer offset includes: verifying the dedicated consumer is assigned to the requested topic and partition, where if the verification fails then throw an error, otherwise call commitSync on related dedicated consumer with the desired topic partition and offset.

A message consumption interceptor 212 (entry point component) intercepts messages published to the topic by the publisher 202 prior to those messages being delivered to the consumer 206. The message consumption interceptor 212 operates such that if idempotency is enabled for the received message and topic and if the point of no return is "consuming" (which is designed by default when the point of no return value is not populated) then the dedicated consumer offset is modified. The message consumption interceptor 212 populates idempotency information on the thread context (e.g. msg key, topic, offset, keeper-offset-modified, point of no return, consumer group), and calls related message delegate.

A database (DB) operations interceptor 216 processes database transactions. Before committing a database transaction, the DB operations interceptor 216 determines whether idempotency information is populated, and keeper-offset-modified is set to false, and point of no return is "database transaction." If all of these conditions are met, then the DB operations interceptor 216 modifies the dedicated consumer offset, updates thread context and only then commits the transaction to the database. If offset modification failed, then the DB operations interceptor 216 aborts the database transaction (and throws a related exception).

The publish-subscribe system 200 generates alerts or log entries:

1) On a partition assignment trigger—In case of skipped messages (dedicated consumer offset >microservice offset), then write error to log with messages details, set status=skipped, and send custom metrices.
2) In case of a transaction commit fail for microservice consumer, then write log error with messages details, set status=completed, commit failed, and send custom metrices.

It should be noted that alert rules can be configured in the publish-subscribe system 200. For correlations between alerts, populate all related information on alerts, such as topic, msg key, partition, consumer group.

To provide protection from duplicated published messages, the local cache 218 (with time to live (TTL)) is employed for handled messages identifiers (idempotency enabled messages only). The TTL is configurable.

On IK commit, a pre-commit validation is performed, whereby if a message key exists on local store then a duplicate exception is thrown. Additionally, offset metadata is stored in the committed timestamp. Further, the message identifier is added to the local cache 218.

The publish-subscribe system 200 pulls all messages which were inserted to the partition between (last committed IK timestamp—TTL) and (last committed 1K timestamp). The pulled message keys are uploaded to the local cache 218.

In order to prevent disconnection of a real consumer 206 during cache reload, the consumer 206 is paused before pulling the message keys and is resumed after the pulling of the message keys. Note: the publisher 202 must use partitioning key logic in order to send all messages of same key to same partition, otherwise protection cannot be guaranteed.

Figure 3:
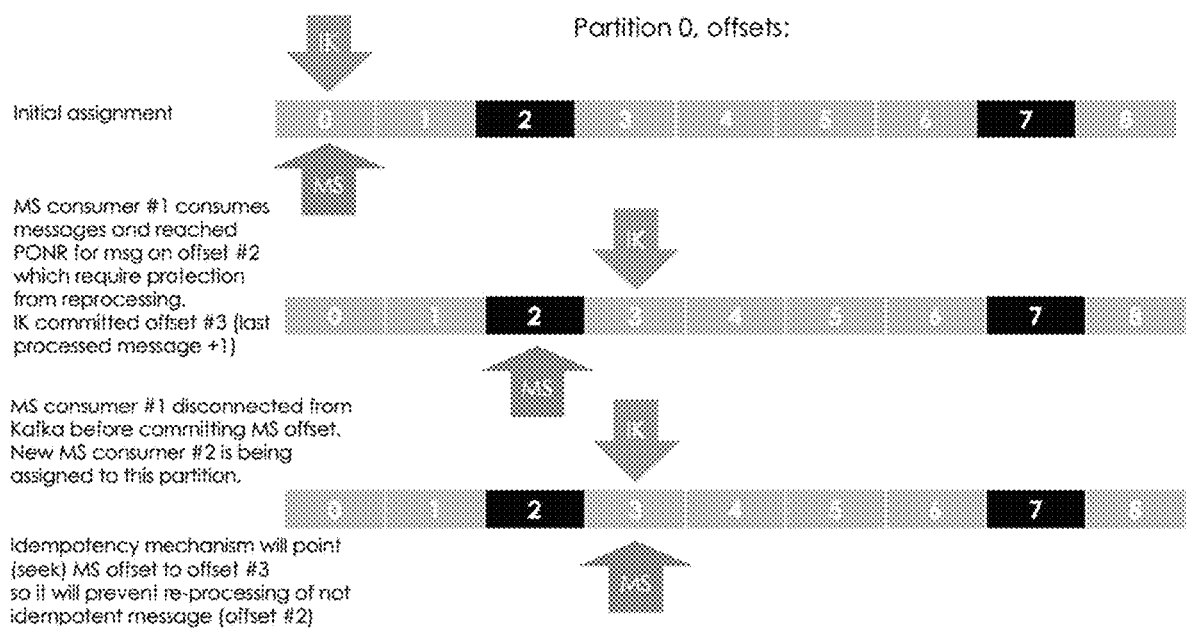
FIG. 3 illustrates an example of offsets stored by a dedicated consumer created for a subscribed topic for a specific consumer to provide an exactly once messaging protocol in a publish-subscribe messaging system, in accordance with one embodiment.

FIG. 3 illustrates an example of offsets stored by a dedicated consumer created for a topic to provide an exactly once messaging protocol in a publish-subscribe messaging system, in accordance with one embodiment. As an option, the offsets may be implemented in the context of the details of the previous figure and/or any subsequent figure(s). Of course, however, the offsets may be implemented in the context of any desired environment. Further, the aforementioned definitions may equally apply to the description below.

The present example, on binding/rebalancing/reassignment of a consumer to a topic subscription (e.g., Kafka topic partition), it is ensured that the consumer will start processing messages from appropriate offset (i.e. the lowest offset which was not handled yet/reached point of no return) and the local store (cache) is synced with latest handled messages.

For each topic and consumer group, if the idempotency flag is enabled, then a new consumer group will be created for this topic, who will hold the point of no return positions. The IK (dedicated) consumer is not a real consumer and used only to store per each topic partitions the maximum position of messages that reach the point of no return on the original consumer. In other words, the IK consumer does not pull/process any message, and its offsets are managed by the real consumer.

As shown in the present example, the actual consumer (shown as MS) and IK consumer (shown as IK) both begin at offset 0 for partition 0. The original consumer consumes messages and reaches a point of no return for the message on offset 2 which requires protection from reprocessing, while the IK consumer committed offset 3 (i.e. the last processed message +1). Then, the original consumer disconnects from the microservice before committing the offset 3. In this case, a new consumer is subsequently assigned to partition 0. The idempotency mechanism will point (seek) the new consumer offset (MS) to offset 3 so that it will prevent reprocessing of the not idempotent message (i.e. offset 2).

Figure 4:
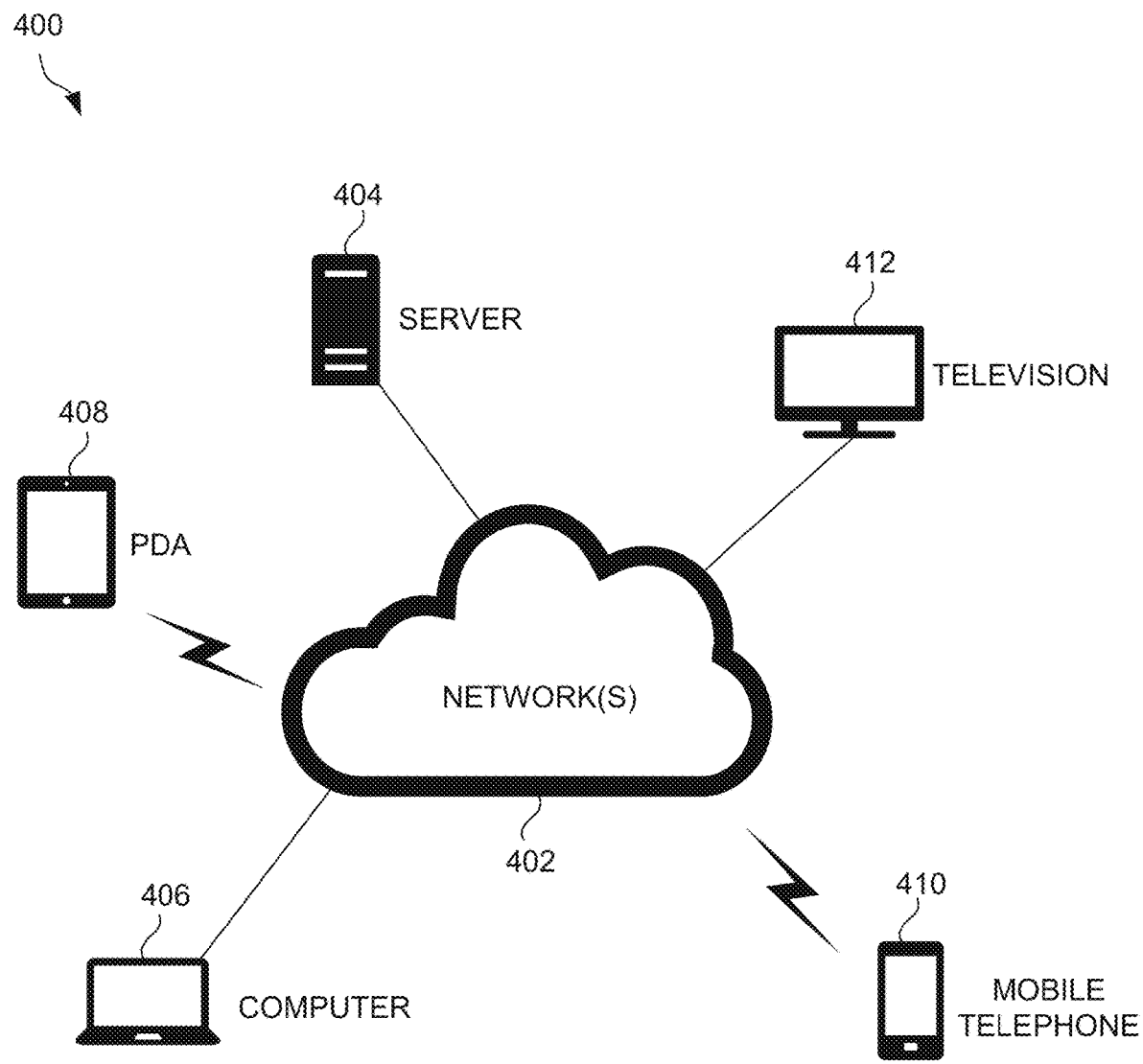
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
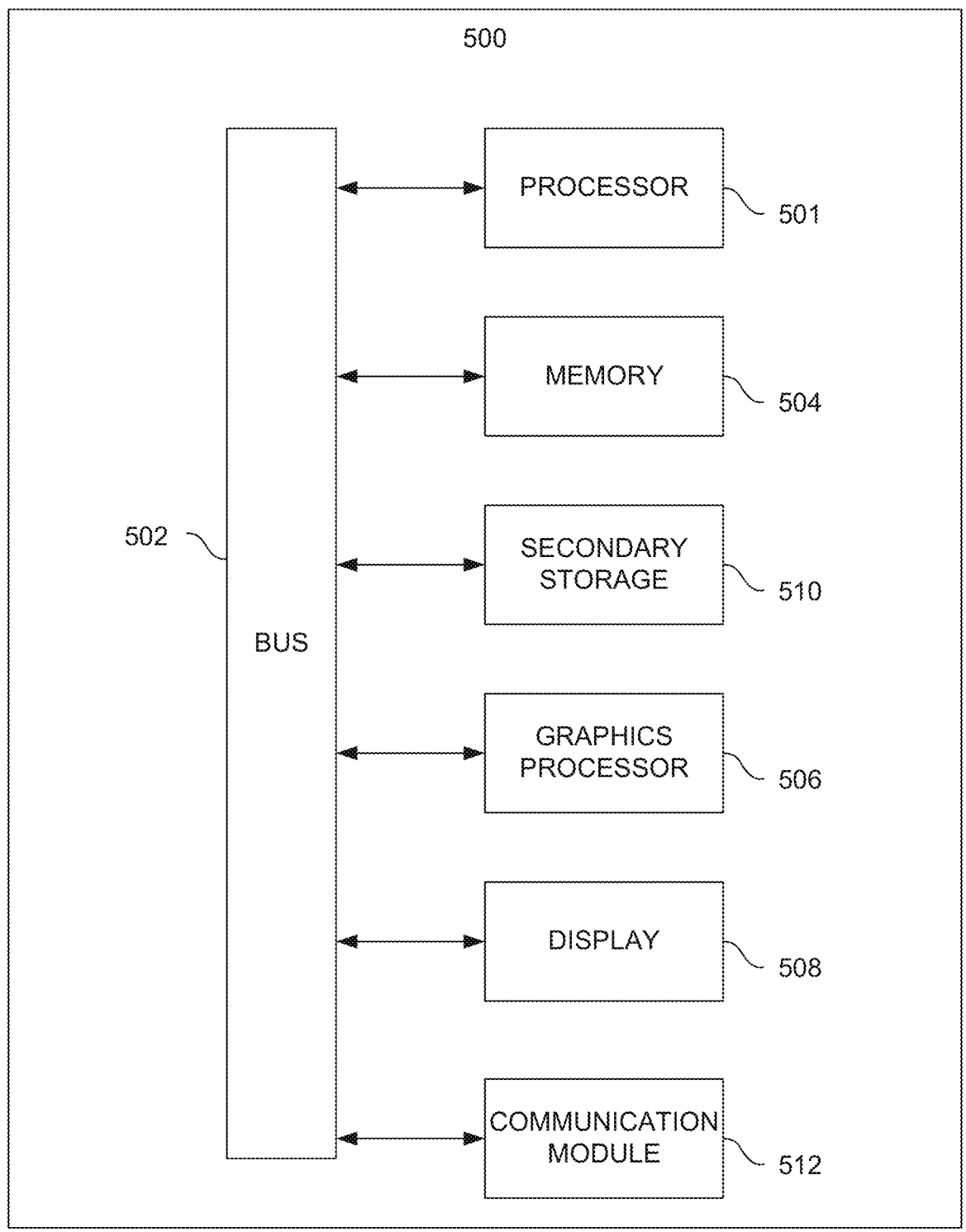
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   identify a consumer and its subscribed topics in a publish-subscribe messaging system;
   for each required consumer, and for each subscribed topic of the consumer:
      determine that an idempotency flag is enabled for the topic of the publish-subscribe messaging system, and
      create a new dedicated consumer for the topic in the publish-subscribe messaging system when the idempotency flag is enabled on an associated consumer configuration for the topic of the publish-subscribe messaging system;
   use the new dedicated consumer to ensure that messages published to the topic are delivered exactly once to each associated consumer.

2. The non-transitory computer-readable media of claim 1, wherein the topic is a messaging channel to which messages are published by one or more publishers of the publish-subscribe messaging system.

3. The non-transitory computer-readable media of claim 2, wherein the topic is a messaging channel to which one or more consumers of the publish-subscribe messaging system subscribe for receiving the messages published to the topic by the by one or more publishers of the publish-subscribe messaging system.

4. The non-transitory computer-readable media of claim 1, wherein the new dedicated consumer is created for a consumer group of the topic of the publish-subscribe messaging system.

5. The non-transitory computer-readable media of claim 1, wherein the new dedicated consumer is created for a microservice using the topic of the publish-subscribe messaging system.

6. The non-transitory computer-readable media of claim 1, wherein the new dedicated consumer is created for the topic of the publish-subscribe messaging system when a microservice using the topic of the publish-subscribe messaging system starts up.

7. The non-transitory computer-readable media of claim 1, wherein the device is further caused to:
   store, in the new dedicated consumer, a maximum position of each message published to the topic that reaches a point of no return on a consuming flow of an associated consumer.

8. The non-transitory computer-readable media of claim 7, wherein the point of no return is a first non-idempotent operation on a flow executed for message processing in the publish-subscribe messaging system.

9. The non-transitory computer-readable media of claim 8, wherein the point of no return is predefined for the topic and includes one of:
   modifying the position automatically before starting a message consumption within the flow executed for the message processing, modifying the position automatically before committing a first database transaction on the flow executed for the message processing, or modifying the position on an application-developer configured point of the flow executed for the message processing.

10. The non-transitory computer-readable media of claim 7, wherein the position of each message is an offset.

11. The non-transitory computer-readable media of claim 1, wherein the new dedicated consumer does not store messages published to the topic of the publish-subscribe messaging system.

12. The non-transitory computer-readable media of claim 1, wherein the new dedicated consumer is used upon binding a consumer to a subscription to the topic.

13. The non-transitory computer-readable media of claim 1, wherein the new dedicated consumer is used upon rebalancing of consumers to a subscription to the topic.

14. The non-transitory computer-readable media of claim 1, wherein the new dedicated consumer is used upon reassignment of consumers to a subscription to the topic.

15. The non-transitory computer-readable media of claim 1, wherein the new dedicated consumer is used to indicate which messages the current consumer should start processing.

16. The non-transitory computer-readable media of claim 1, wherein the new dedicated consumer is used to indicate a lowest offset of a message that has not yet reached a point of no return.

17. The non-transitory computer-readable media of claim 1, wherein the device is further caused to:

sync a local cache with one or more latest handled messages.

18. A method, comprising:

at a computer system:

identifying a consumer and its subscribed topics in a publish-subscribe messaging system;

for each required consumer, and for each subscribed topic of the consumer, creating a new dedicated consumer for the topic in the publish-subscribe messaging system;

using the new dedicated consumer to ensure that messages published to the topic are delivered exactly once to each associated consumer wherein a maximum position of each message published to the topic that reaches a point of no return on a consuming flow of an associated consumer is stored in the new dedicated consumer.

19. A system, comprising:

a non-transitory memory storing instructions; and one or more processors in communication with the non-transitory memory that execute the instructions to:

identify a consumer and its subscribed topics in a publish-subscribe messaging system;

for each required consumer, and for each subscribed topic of the consumer, create a new dedicated consumer for the topic in the publish-subscribe messaging system;

use the new dedicated consumer to ensure that messages published to the topic are delivered exactly once to each associated consumer;

wherein the new dedicated consumer is used to indicate a lowest offset of a message that has not yet reached a point of no return.

\* \* \* \* \*